United States Patent [19]
Johnson et al.

[11] Patent Number: 5,820,160
[45] Date of Patent: Oct. 13, 1998

[54] AIRBAG INFLATOR WITH VENTURI EFFECT COOLING AND GAS SUPPLEMENT

[75] Inventors: Darrin L. Johnson, Uintah Highlands, Utah; Brett Hussey, Murr, Germany; Linda M. Rink, Liberty, Utah

[73] Assignee: Autoliv ASP, Inc., Ogden, Utah

[21] Appl. No.: 609,665

[22] Filed: Mar. 1, 1996

[51] Int. Cl.$^6$ ................................................. B60R 21/32
[52] U.S. Cl. .................. 280/736; 137/68.13; 137/888; 280/728.2; 280/732; 280/738; 280/740; 280/742
[58] Field of Search .................... 280/736, 732, 280/728.2, 728.1, 738, 740, 741, 742; 102/530, 531; 239/128, 132, 428.5, DIG. 7; 137/888, 68.13

[56] References Cited

U.S. PATENT DOCUMENTS

| | | |
|---|---|---|
| 3,624,810 | 11/1971 | Hass . |
| 3,632,133 | 1/1972 | Hass . |
| 3,680,886 | 8/1972 | Mazelsky ................................. 280/740 |
| 3,690,695 | 9/1972 | Jones, Sr. . |
| 3,909,037 | 9/1975 | Stewart ............................. 280/150 AB |
| 4,833,996 | 5/1989 | Hayashi et al. . |
| 4,877,264 | 10/1989 | Cuevas . |
| 5,004,586 | 4/1991 | Hayashi et al. ........................... 422/164 |
| 5,058,921 | 10/1991 | Cuevas ..................................... 280/741 |
| 5,129,674 | 7/1992 | Levosinski ............................... 280/738 |
| 5,259,643 | 11/1993 | Kraft et al. .............................. 280/740 |
| 5,286,054 | 2/1994 | Cuevas ..................................... 280/738 |
| 5,441,303 | 8/1995 | Rozanski ................................. 280/738 |
| 5,489,117 | 2/1996 | Huber ....................................... 280/738 |
| 5,509,686 | 4/1996 | Sheperd et al. . |

FOREIGN PATENT DOCUMENTS

| | | |
|---|---|---|
| 496267 | 7/1992 | European Pat. Off. . |
| 614787 | 9/1994 | European Pat. Off. ................ 280/738 |
| 4139042 | 6/1992 | Germany .............................. 280/738 |
| 563988 | 6/1957 | Italy ....................................... 239/132 |
| 1324401 | 7/1973 | United Kingdom . |
| 9518730 | 7/1995 | WIPO . |

Primary Examiner—Eric D. Culbreth
Attorney, Agent, or Firm—Sally J. Brown

[57] ABSTRACT

An airbag inflator with venturi effect cooling and gas supplement. The inflator includes a housing having a quantity of gas-producing fuel therein, and possibly a stored gas also, along with appropriate igniters. These materials are stored within a gas production chamber of the housing. The gas leaving this chamber travels through the housing to an exit port on the housing. Intermediate the gas production chamber and the housing exit port is a venturi section of the housing. This section reduces the pressure of the gas, and thus the pressure at the interior end of draw vents opening onto the venturi section. The vents therefore draw outside air into the housing to mix with the gas. This cools the gas to the desired temperature, and also supplements the gas exiting the housing. As such, the need for a heat sink to cool the gas is reduced or eliminated. Furthermore, since the cushion is inflated with a mixture of gas and air, the amount of gas typically needed is reduced by the amount of added air. This permits the amount of fuel to be reduced, thus reducing cost and weight.

8 Claims, 2 Drawing Sheets

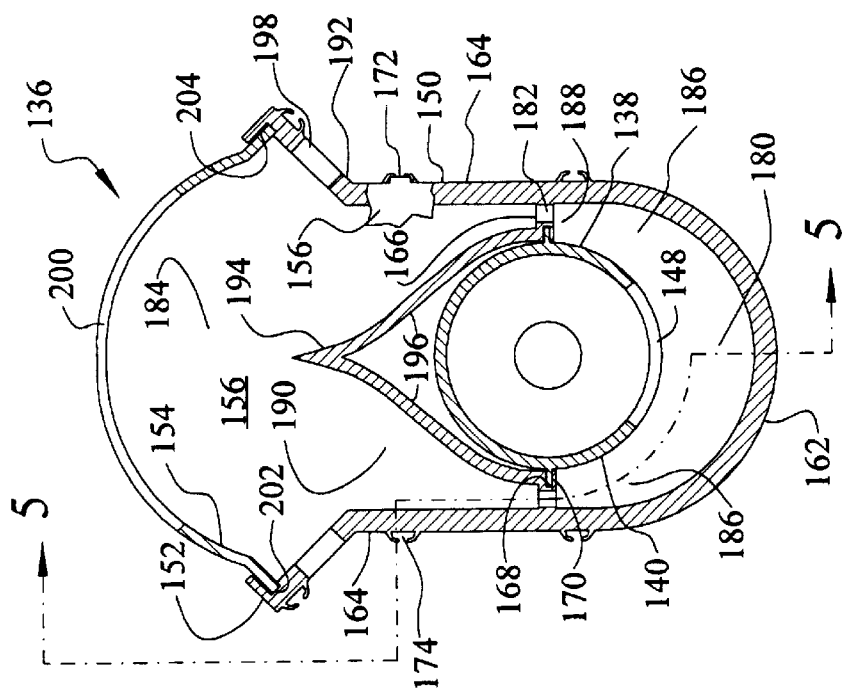
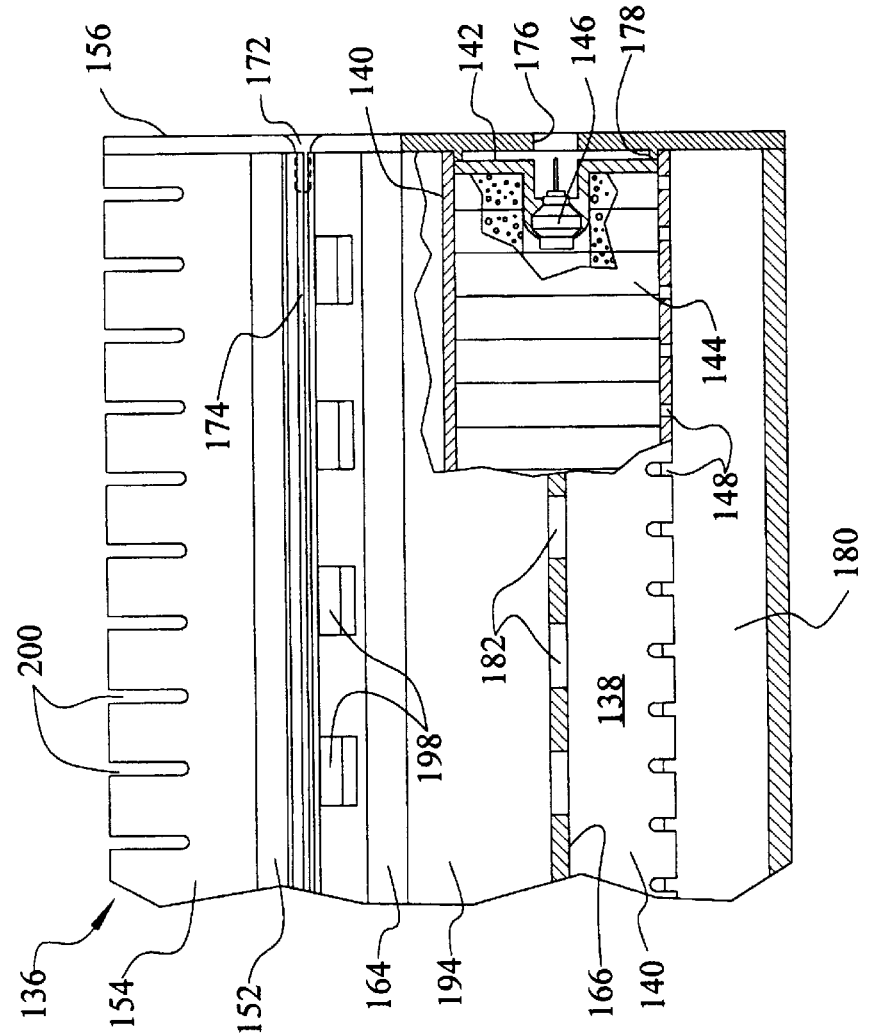
Fig. 4
Fig. 5

AIRBAG INFLATOR WITH VENTURI EFFECT COOLING AND GAS SUPPLEMENT

BACKGROUND OF THE INVENTION

1. Field of the Invention

The present invention relates in general to airbag passive restraint systems. In particular, the present invention relates to an improved inflator for use with such systems.

2. Description of the Related Art

Airbag passive restraint systems typically include several basic components. These include an inflator to produce a quantity of inflation gas and a cushion to receive the gas and inflate to protect the passenger. This inflation typically takes place in a very short time, on the order of one tenth of a second.

The inflator generally takes the form of a strong housing containing some type of fuel and an ignition device. When a collision occurs, the ignition device triggers the fuel to burn or react. This reaction creates a quantity of hot gas which (possibly after mixing with a stored gas in the housing) exits the housing and enters the cushion. As is well known, the pressure of a gas increases with temperature, and as such, less of the hot gas is required to inflate the cushion to the desired pressure, compared to a cold gas.

This hot gas will, however, heat the cushion. Since the passenger directly contacts the cushion, the cushion temperature must be kept to an acceptable level to avoid injuring the passenger. Since the typical fuels used in inflators are quite energetic to produce the gas in the short amount of time available, it has been necessary to provide a heat sink in the inflator.

These heat sinks commonly take the form of metal meshes or ceramic foams through which the gas flows. During this flow the gas transfers some of its heat to the heat sink, lowering the temperature of the gas. These heat sinks are also often used to filter particulate material from the gas. For many fuel types, however, the main function is that of cooling the gas.

As may be seen, it is inefficient to create a gas which is too hot, and then cool it to the proper temperature. Specifically, the cost of the heat sink, and its added weight, could be avoided if the gas were produced at the desired lower temperature. While efforts have been made to produce fuels which create cooler gas, results have been disappointing. The need to cool the gas is therefore a continuing problem.

A further continuing problem with airbag inflators is weight. All of the components of the inflator are of course maximized to reduce weight. One area that has seen little weight reduction, however, is the fuel. Since the inflator must produce a set quantity of gas, the inflator must be provided with a corresponding amount of fuel.

SUMMARY OF THE INVENTION

An object of the present invention is to provide an airbag inflator which reliably produces gas to provide passenger safety.

Another object of the present invention is to provide such an inflator which eliminates or reduces the need for a heat sink.

Yet another object of the present invention is to provide such an inflator which uses ambient air to mix with the gas for cooling.

A further object of the present invention is to provide such an inflator which requires less fuel, thus reducing weight, by supplementing the gas with the cooling air.

These and other objects are achieved by an airbag inflator with venturi effect cooling and gas supplement. The inflator includes a housing having a quantity of gas-producing fuel therein, and possibly a stored gas also, along with appropriate igniters. These materials are stored within a gas production chamber of the housing. The gas leaving this chamber travels through the housing to an exit port on the housing. Intermediate to the gas production chamber and the housing exit port is a venturi section of the housing. This section reduces the pressure of the gas, and thus the pressure at the interior end of draw vents opening onto the venturi section. The vents therefore draw outside air into the housing to mix with the gas. This cools the gas to the desired temperature, and also supplements the gas exiting the housing. As such, the need for a heat sink to cool the gas is reduced or eliminated. Furthermore, since the cushion is inflated with a mixture of gas and air, the amount of gas typically needed is reduced by the amount of added air. This permits the amount of fuel to be reduced, thus reducing cost and weight.

BRIEF DESCRIPTION OF THE DRAWINGS

The objects and features of the invention noted above are explained in more detail with reference to the drawings, in which like reference numerals denote like elements, and in which:

FIG. 4 is a cross-sectional end view of a fourth embodiment of an inflator according to the present invention; and FIG. 5 is a side view of the inflator of FIG. 4 in partial cross-section.

DETAILED DESCRIPTION OF THE INVENTION

Figure 1:
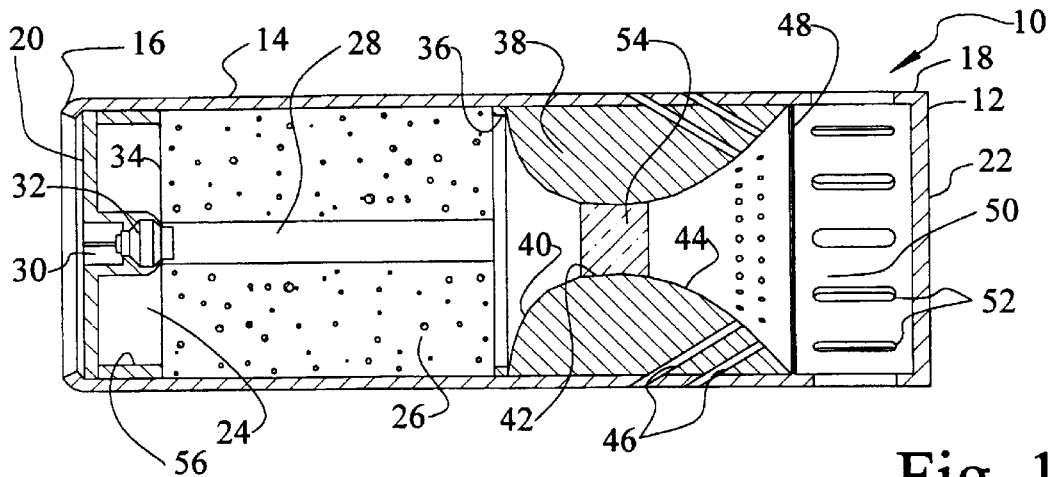
FIG. 1 is a cross-sectional side view of a first embodiment of an inflator according to the present invention.

With reference to FIG. 1, an inflator according to the present invention is generally designated by reference numeral 10. The inflator 10 includes an outer housing 12 formed of strong, rigid material, typically steel or aluminum. The housing 12 may take various forms, but for reduced manufacturing cost a cylinder is typically preferred. As such, in the embodiment shown the housing 12 is formed by a tubular side wall 14 having first and second ends 16 and 18, respectively. These ends are closed by disc-shaped first and second end walls 20 and 22, respectively.

Within the inflator, adjacent the first end 16, there is defined a generant chamber 24. The generant chamber includes a quantity of gas generating material 26. As is known, this material may take several forms, such as powder, pellets, unitary masses, etc. Further, the material could take the form of a stored inert gas together with a heating device, such as a pyrotechnic or self contained fluid fueled heater. Finally, stored gas fluid fuels with initiators could also comprise the gas generating material. With appropriate modification any of these forms could be employed. In the preferred embodiment, however, the gas generating material 26 takes the form of a unitary mass, and most preferably a tubular mass having a central cavity 28.

To ignite the gas generating material, the first end wall 20 is provided with a mounting hole 30, which receives and secures an initiator, or squib, 32. The rear end of the initiator includes an electrical connector for connection to a collision sensor (not shown) which provides a signal to activate the initiator and thus the inflator 10. The front end of the squib extends into the generant chamber 24. To accommodate the front end of the initiator, the initiator may be received within the central cavity 28 of the gas generating material, or a rear end 34 of the gas generating material may be spaced from the initiator, as shown. As may be envisioned, if the gas generating material takes the form of pellets or powder, these pellets or powder may simply surround the initiator.

As may be seen, a rear end of the generant chamber is therefore defined by the first end wall 16. A front end of the generant chamber is defined by a retainer 36. The retainer 36 serves to secure the gas generating material 26 against the first end wall 20. For the unitary tubular gas generating material shown, this may be achieved by a retainer 36 in the form of a ring secured against the inner face of the housing side wall 14. To maintain its position, the retainer may be partially received in a peripheral groove (not shown) extending around the inner face of the side wall 14 or may simply abut against the side wall 14 with a sufficient force.

For other forms of gas generating material, more substantial retainers are needed. For example, a retainer in the form of a disk (not shown) having numerous perforations could be employed with gas generating material in the form of pellets. For powdered gas generating material, these perforations could be made smaller, and/or be covered with a layer of aluminum foil or other film. This film would prevent escape of the powder during storage, but would rupture at each perforation when the gas generating material is ignited. With each of these arrangements it may be seen that combustion of the gas generating material will cause the inflation gas to be produced and flow towards the second end 18.

Adjacent the generant chamber 24, and more particularly intermediate the generant chamber 24 and second end 18, there is a venturi section 38. Within the venturi section the diameter of the housing is effectively reduced. Specifically, the venturi section includes a convergent section 40 closest to the generant chamber 24. In this convergent section the inner diameter of the venturi section is reduced in a gradual manner in a direction from the first to second end of the inflator. The venturi section also includes a throat section 42 at its minimum diameter. Finally, at the end furthest from the generant chamber, the venturi section includes a divergent section 44. In this divergent section the inner diameter of the venturi section is enlarged in a gradual manner, again in the direction from the first to second ends of the inflator.

As will be recognized, the classic convergent, throat and divergent sections correspond to a typical venturi. Further, since the first end wall 20 is secured to the side wall 14, the gas produced by the material 26 must flow through the venturi section 38 towards the second end of the inflator. As is typical of a venturi, the quantity of gas entering the convergent section is constricted due to the reducing diameter. As such, the gas increases its velocity toward the throat section. From principles of fluid dynamics, it is known that this increase in velocity is accompanied by a reduction in pressure, compared to just upstream of the convergent section.

This reduction in pressure is employed in the present invention to draw in ambient air. Specifically, the housing and venturi section include a plurality of draw ports 46 connecting the interior of the venturi section with the outside, ambient air (i.e., atmosphere). So long as the pressure at the interior ends of the draw ports is less than that of the atmosphere, air will be forced through the draw ports and into the venturi section. This air will mix with the gas produced by the material 26 to produce a final gas.

This mixing has two effects. First, it cools the gas, since the air will be at a lower temperature than the gas. As such, the final gas exiting the venturi has a reduced temperature compared to pure gas from the material 26. As noted above, this reduced temperature is safer for the passenger, and the desired final temperature is that which will provide proper inflation without passenger injury. Additionally, this reduction in temperature is achieved without the use of a heat sink, eliminating the cost and weight of the heat sink.

Second, the air travels with the gas, increasing the amount of final inflation gas which exits the venturi section. In other words, the quantity of final gas leaving the venturi section is greater than the quantity of pure gas entering the venturi section. This is advantageous since a fixed quantity of inflation gas is needed to inflate the cushion (not shown). By using the final gas as the inflation gas, less gas generating material 26 is required compared to an inflator having no mixing with air. This reduces weight and cost further.

It is noted that the location of the interior ends of the draw ports will influence the amount of air drawn in for mixing, since the pressure varies along the length of the venturi section. As such, the location of these ports may be used to determine the characteristics of the cooling and gas supplement. Furthermore, the variation in pressure along the venturi section depends upon the pressure developed in the generant chamber 24.

Specifically, if the pressure is below a certain value, the velocity of the gas will remain subsonic. If this is the case, the minimum pressure would be achieved at the throat section of the venturi. However, if the pressure in the generant chamber is above this value, the velocity of the gas will reach the speed of sound at the throat section. Further, the velocity of the gas will actually increase to supersonic speeds in the divergent section. As such, the minimum pressure of the gas will be achieved in the divergent section. In the embodiment shown, supersonic speeds are expected, and as such the inner ends of the draw ports are located in the divergent section.

In this embodiment the venturi section is formed as a separate unit which is inserted into the housing. For this arrangement the venturi section may be formed of a ceramic molded to the proper shape, a metal cast or formed to the proper shape, or other materials which may withstand the heat and pressure developed. As shown, the divergent section of the venturi is located closest to the second end 18, but is spaced therefrom. To achieve this spacing, the interior of the housing may be provided with an interior peripheral ridge 48 against which the venturi will abut. Other arrangements, such as a groove with a ring received therein, could also be employed. As shown, the venturi is therefore held between the ridge 48 and the retainer 36.

Between the divergent section of the venturi and the second end there is an open mixing section 50 where the gas and air are permitted to mix. The side wall 14 in this mixing section includes a plurality of exit ports 52 extending therethrough. The final gas may thus flow through the exit ports to enter the cushion. It is noted that the second end wall 22 is securely retained to the side wall 14, such as by welding or as by forming this end wall as a monolithic portion of the side wall, as shown.

In the embodiment shown the exit ports are open. This will permit moisture to enter the housing, at least in the mixing section 44. To prevent moisture from contaminating the gas generating material 26, it is preferred to employ a seal plug 54 at the throat section of the venturi. Such a plug may be formed of silicone or other like material. During activation of the inflator, the seal plug 54 would be forced from the throat by the pressure in the generant chamber, and would impact against the inner face of the second end wall 22. Other seal arrangements could be employed, such as wrapping the gas generating material in an appropriate sealing material, such as aluminum foil and/or plastic, or sealing a layer of foil over the interior of the housing to cover the exit ports 46.

To construct this inflator, the housing side wall 14 is first joined to the second end wall 22. As noted this may be achieved by forming these components as a monolithic unit, such as by drawing or impact extruding the side and end wall as a unit. The exit ports 46 could then be formed through the side wall, and the ridge 42 formed in (or inserted into) the side wall adjacent the exit ports. Thereafter, the venturi section would be inserted into the housing to abut against the ridge 48, and the retainer 36 placed in position. At this time, with the venturi section secured, the draw ports 46 may be drilled through the side wall 14 and venturi section.

Upon cleaning out any debris, the plug 54 may be placed in position in the throat section 42. The gas generating material could then be inserted behind the retainer, and the first end wall 20 secured in position as by welding. Alternatively, it may be desirable to roll the first end 16 over the edge of the first end wall 20 to secure the same in position, as shown. If this is the case, it may be desirable to place a seal ring 56 between the rear end 34 of the gas generating material and the first end wall 16. The seal ring may be formed of a high temperature resistant sealing material, such as high temperature rubber, and serves to prevent any gas from escaping between the end and side wall.

As may be seen, the inflator 10 will provide a cooled gas without the need for any heat sink material. Further, the amount of final gas provided to the cushion is supplemented by the air, and is greater than the actual amount of gas produced by the material 26. As such, this inflator provides advantageous results.

Figure 2:
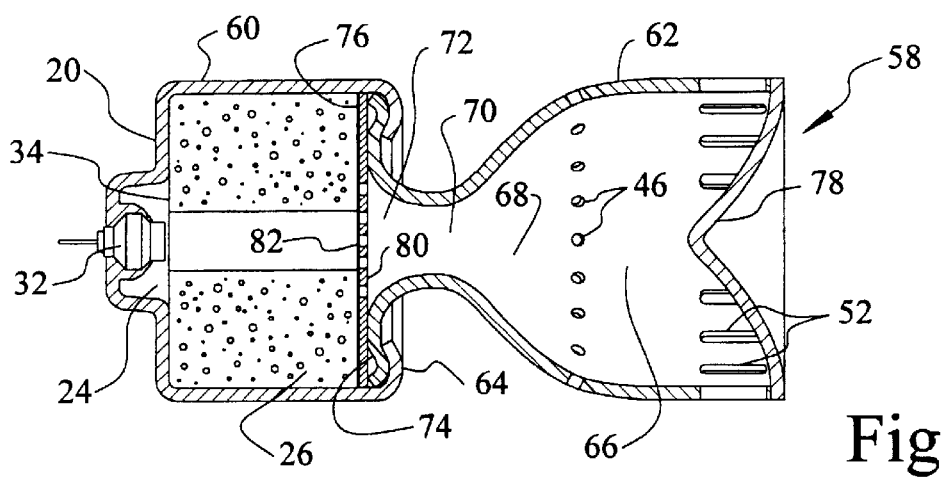
FIG. 2 is a cross-sectional side view of a second embodiment of an inflator according to the present invention.

With reference to FIG. 2, a second embodiment of an inflator according to the present invention is generally designated by reference numeral 58. In this embodiment many of the components are similar to those in the first embodiment, and these like elements are designated with like reference numerals.

The main difference in this embodiment is the housing construction. Whereas the first embodiment employed the cylindrical full-length side wall 14, this second embodiment employs a multi-sectioned housing.

In particular, the side wall is formed as a rear side wall portion 60 and a front side wall portion 62. The rear side wall portion 60 surrounds the periphery of the generant chamber 24, and is preferably formed as a monolithic unit (such as by drawing or impact extrusion) with the first end wall 20. If these components are formed as a monolithic unit, there is no need for the seal ring 56, and the seal ring may be omitted, and the end wall 20 placed in abutment with the rear end 34 of the generant, as shown. The forward end of the rear side wall portion 60 (opposite the first end wall) preferably includes a retainer skirt 64 which takes the form of a continuous tubular extension of the rear side wall portion prior to assembly.

The front side wall portion 62 takes a complex flared form, having, from the front to rear, a tubular mixing portion 66, a diverging (i.e., in the direction of gas flow) portion 68, a minimum diameter throat portion 70, and a converging portion 72. As may be seen, in this embodiment the front side wall portion will thus form the venturi section 38 without the need for an insert. The front side wall portion may be formed into this complex shape by one or more steps of impact extrusion, drawing or rolling.

In the embodiment shown, the converging portion 72 includes a flange 74 extending generally radially of the longitudinal axis of the inflator, and adapted to be placed against reforming screen 80. In this position the peripheral edge of the flange 74 will preferably be within the confines of the peripheral edge of the material 26, and will be surrounded by the retainer skirt 64. To secure the front and rear side wall portions together, the retainer skirt 64 may be crimped or rolled over to thus clamp the flange 74 between the gas generating material 26 and the retainer skirt, as shown.

Alternatively, the converging portion 72 could extend to a diameter equal to that of the rear side wall portion, and these two components could be welded together. If welding is used, the converging portion 72 need not be formed entirely by the front side wall portion, but could be partially (or fully) formed by the rear side wall section. However, this is typically not preferred, as it requires the formation of two complex shapes, and complicates placement of the gas generating material.

The forward end of the front side wall portion is sealed with a front guide wall 78, such as by welding. As shown, the front guide wall includes a complex semi-conical shape, tapering toward the venturi section. While a flat front end wall as in the first embodiment could be employed, the complex shape shown will tend to guide the flow radially toward the exit ports 52. This should reduce stresses upon the inflator. Additionally, the presence of the conical shape tends to reduce the area through which the gas flows, and may act as a convergent nozzle to slow the final mixed gas to sub-sonic speeds.

As in the first embodiment, the gas generating material should be protected from moisture. A plug could be provided in the throat section as in the previous embodiment, or the material 26 could be wrapped in a sealing material. In this embodiment, however, there is provided a retaining screen 80 in the form of a plate having numerous perforations therein. Additionally, a layer of foil 82 or other moisture impervious material is placed between the gas generating material and the retaining screen. As may be envisioned, during activation of the inflator the layer 82 is ruptured at each of the perforations, permitting the gas to freely pass through the retaining screen.

With this embodiment all of the advantages (i.e., mixing and supplementation of the gas) are achieved, while eliminating certain drawbacks of the first embodiment. For example, in the first embodiment the savings in weight and cost from eliminating the heat sink were greatly offset by the need to provide the insert to form the venturi section. In this second embodiment, however, the housing itself forms the venturi section, reducing weight to a minimum. While the cost of producing this housing is greater, the savings are believed to be greater than in the first embodiment. Additionally, in this embodiment the final gas may be slowed to sub-sonic speeds due to the guide wall 78. This feature could of course be added to the first embodiment if desired.

Figure 3:
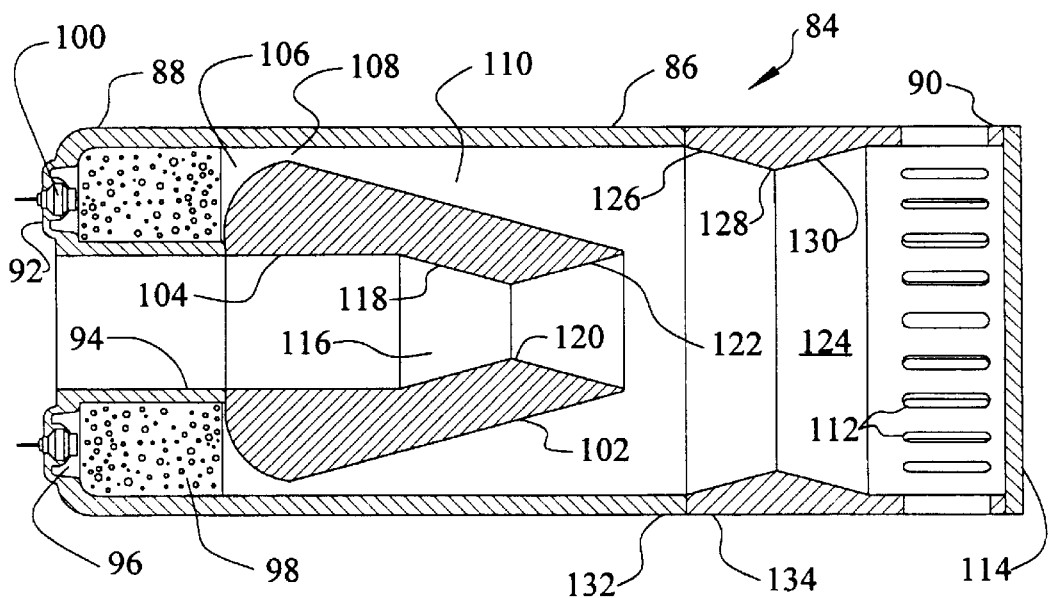
FIG. 3 is a cross-sectional side view of a third embodiment of an inflator according to the present invention.

With reference to FIG. 3, a third embodiment of the present invention is generally designated by reference numeral 84. In this embodiment the differences are numerous, in that the air is not drawn in through the side wall, but axially.

As shown, this inflator includes a housing having a generally tubular side wall 86, having first and second ends 88 and 90, respectively. The housing further includes a first end wall 92 secured to the first end 88, as by welding. The first end wall 92 in this embodiment is not circular, but is annular, with the outer periphery being secured to the side wall 86. The inner periphery of the first end wall mounts an intake wall 94. The intake wall is tubular, and has its rear end secured to the first end wall as by welding or monolithic construction.

The rear portion of the side wall 86, the first end wall, and the intake wall together define a generant chamber 96. As may be seen, in this embodiment the generant chamber is annular. As before, the generant chamber receives a quantity of gas generating material 98, which may again be powder, pellets or wafers. To ignite the material 98, one or more initiators 100 are provided, preferably mounted through the first end wall 92. The use of more than one initiator may be desirable to achieve a more uniform ignition of the material 98 about its circumference, for reasons made apparent below.

The forward end of the intake wall 94 mounts a venturi ring 102. The ring, like the insert of the first embodiment may be formed of ceramic bonded to the intake wall, but is preferably formed of metal welded in position. The ring 102 takes a generally tubular form, and includes a central opening 104 having a diameter approximately matching that of the intake wall. The outer diameter of the venturi ring varies along its length, increasing from the rear end forward to a maximum diameter, and then decreasing again.

As may be seen, these variations in outer diameter cause variations in the annular space between the outer diameter of the venturi ring and the side wall 86. In particular, the increase in diameter from the rear end to the maximum diameter forms a converging annular section 106. Similarly, the maximum diameter forms an annular throat section 108. Finally, the reduction in diameter from the maximum forms a diverging annular section 110. It may therefore be seen that the venturi ring, together with the side wall, forms a venturi section as in the previous embodiments, although having an annular configuration.

The front end of the side wall includes a plurality of exit ports 112, and mounts a second end wall 114 in the form of a disk. To assemble the inflator 84, the side wall and first end wall are preferably formed as a monolithic unit as by drawing or impact extrusion. The intake wall 94 could then be attached to the first end wall, or could be formed as a monolithic unit with the side and first end wall. Thereafter the generant material 98 would be inserted into the generant chamber 96, and the venturi ring 102 secured in place. To complete the inflator, the second end wall is attached to the second end of the side wall.

In operation, the initiator(s) would cause combustion of the gas generating material, producing the gas at a high pressure. This gas would move through the converging annular portion, gaining velocity, and then the annular throat section, gaining further velocity. If the pressure is sufficiently high, as is desired, the gas flowing into the diverging annular section will gain further speed, and in particular reach supersonic velocities.

As noted above, this causes a reduction in pressure. As the gas flows beyond the forward end of the venturi ring this reduced pressure will still be present. As such, ambient air is drawn in through the intake wall 94 and the central opening 104 of the venturi ring. This air will mix with the gas, and flow with the gas to the second end 90. This mixture of air and gas forms the final inflation gas which flows through the exit ports 112. As with the previous embodiments, the ambient air serves to cool the gas and to supplement the gas.

While this arrangement is acceptable, further refinements may be made to increase the effectiveness of the inflator 84.

As a first variation, the central opening 104 of the venturi ring may have a variation in diameter to form a second venturi section 116. Specifically, there may be formed a converging section 118, throat section 120 and diverging section 122 within the central opening, preferably toward the front end of the venturi ring.

As with the previous venturi sections, this second venturi section will serve to increase the velocity of the air passing through the central chamber. Further, if the pressure drop at the front end of the venturi ring is sufficiently large, as is desired, the air will be forced to supersonic velocities. This will serve to provide a closer match in velocities for the gas and air, promoting greater mixing.

As a second variation, the side wall 86, intermediate the front end of the venturi ring and the second end of the side wall, may be provided with a final venturi section 124. As with the other venturi sections, there will be a converging section 126, throat section 128, and diverging section 130. The effect of this final venturi section, however, is opposite to that of those before. Specifically, the supersonic final gas will slow in the converging section 126, until it reaches the speed of sound in the throat section 128. Finally, subsonic velocities will again be reached in the diverging section 130. This reversal of velocity in a final venturi section is similar to that used in supersonic wind tunnels.

With this second variation, the velocity of the final gas mixture is reduced. This has at least two advantages. First, the kinetic energy of the final gas is lower, and as such the cushion is moved toward the passenger with less energy, reducing the amount of "bag slap". Second, the subsonic flow is quieter than supersonic, reducing stress in the passenger.

The final venturi section forms a reduction in diameter in the side wall 86. Such a reduction in diameter may be difficult to form using drawing or impact extrusion techniques, together with the first end wall 92. As such, the final venturi section could be formed by rolling or equivalent techniques on the side wall 86, subsequent to the initial drawing or extrusion steps. This rolling would reduce the diameter of the side wall itself, in a manner similar to the second embodiment. It is noted that the placement of the gas generant in the generant chamber would likely be performed before such rolling.

Alternatively, the side wall 86 may be formed in two sections, a rear section 132 and a front section 134. The dividing line between the front and rear section could be formed at any point between the final venturi section 124 and the first end wall 88. In the embodiment shown, the dividing line is formed just behind the final venturi section. This arrangement permits the rear side wall section 132 to be easily formed using the drawing or extrusion noted above. Additionally, the front side wall section could also be formed using drawing or impact extrusion, or by rolling. Once both sections are formed, they may be welded together to form the complete side wall 86.

It is noted that the variation using the second venturi section, and the variation using the final venturi section are not exclusive. While either variation may be used alone, both variations may be used together, as shown. This would provide the advantages of increased mixing and reduced kinetic energy and sound.

With reference to FIGS. 4 and 5, a fourth embodiment of an inflator is generally designated by reference numeral 136. While the previous embodiments have focused upon inflators having gas flow along the longitudinal axis, the inflator 136 employs gas flow radial of such axis. This inflator is particularly suited to application in a passenger side airbag system.

As shown, the inflator 136 includes a gas insert 138. The insert may be of any design known in the prior art for generating inflation gas for passenger side airbag systems. Such inserts are generally cylindrical, with a cylindrical side wall 140, first end wall 142 and a second end wall (not shown). Within the confines of the side and end walls there is a quantity of gas generating material 144, typically in the form of stacked wafers, as shown. An initiator 146 is mounted in the first end wall to ignite the material 144. Finally, the side wall includes a plurality of gas exit ports 148, with the ports being located over a limited angular extent of the side wall.

The inflator 136 also includes a support housing 150 which receives the insert 138. As best shown in FIG. 4, the support housing includes a generally U-shaped base 152, a diffuser 154 extending across the free ends of the U shape, and a pair of end plates 156. The U-shaped base 152 is preferably formed as an extrusion, and most preferably an aluminum extrusion.

In keeping with the general U-shape, the base 152 includes a cross bar portion 162, preferably having a semicircular form. Extending upward from the cross bar portion are edge walls 164, forming the uprights of the U-shape. The base also includes a pair of runners 166, with each runner extending inward from an associated one of the edge walls.

The inner, free edges of the runners will serve to mount the gas generating insert 138, as best illustrated in FIG. 4. This mounting may be achieved in a number of ways. In the embodiment shown, the free edges of the runners include longitudinally extending grooves 168, and the side wall 140 of the insert 138 includes mating longitudinally extending ribs 170. In this manner, the insert may be mounted to the base by aligning the ribs 170 with the grooves 168, and sliding the insert into the base. Other arrangements are of course possible. For example, the side wall of the insert could include the grooves, and the free ends of the runners could be received in these grooves. Numerous other arrangements will be apparent to those in the art. While arrangements in which the insert is not slid into position are possible, they are not preferred, as made clear below.

The end plates are secured to the respective longitudinal ends of the base (and possibly the diffuser). This may be achieved by welding or suitable adhesive, but it is preferred that the attachment be a mechanical fastening. The end plates may include appropriate holes which align with holes (or partial holes, as is known in the art), and appropriate screws may secure the plate to the base. Alternatively, the plates may include longitudinally extending legs 172 received in channels 174 extruded with the base. The channels could then be deformed over the legs 172, securing the end plate as illustrated.

At least one of the end plates will include a connector hole 176 located to overly the initiator 146, and thus permit access to the initiator. Additionally, the end plate may include a protrusion, such as ring protrusion 178 which mates with a depression in the longitudinal end of the insert 138. Alternatively or additionally, the insert 138 may be provided with the protrusion, which mates with an appropriate hole in the end plate 156.

As may be seen in FIG. 5, the end plates serve to block longitudinal motion of the insert 138 with respect to the base. Forming the insert with the appropriate length will therefore permit the end plates to block all such longitudinal movement. This may be used together with the sliding mount of the insert to the runners 166 to securely retain the insert, without the need for additional fasteners or welding. Additionally, the mating protrusions 178 on the end plates (and/or insert) may serve to position the insert vertically and laterally in the base, eliminating the need for mounting on the runners. While this is possible, a mating arrangement between the insert and runners (such as by the ribs and grooves) may be preferable, as explained below.

As shown, the insert 138 will be mounted in the base such that the exit ports are opposed to the cross bar portion 162, and therefore the gas from the insert will flow into a lower volume 180 bounded by the cross bar portion, runners, and lower half of the insert. Since the gas must have a path from this volume to the cushion, the runners 166 are each provided with a plurality of gas channels 182 extending vertically through the runners. In this manner the gas may flow through the runners to an upper volume 184 bounded by the upper half of the insert, runners, edge walls, and diffuser. It is to ensure that the gas flows through the channels 182, rather than between the insert and runners, that the mating between insert and runners is preferred.

As with the previous embodiments, this flowing is gas forced to create an area of reduced pressure to draw in ambient air for cooling and supplementing the gas quantity. To achieve this, the insert and base are sized and located such that the lower volume 180 forms a converging section 186, throat section 188 and diverging section 190 on each lateral side of the insert, between the insert and each edge wall.

This may be achieved by appropriate design of the shape of the base. In the embodiment shown, the channels 182 through the runners are chosen as the minimum cross-section throat section, and as such the base is formed such that the lower volume 180 converges toward this throat section. In this embodiment, the base is formed such that the center point of the semi-circular cross bar portion 162 is spaced below the longitudinal axis of the tubular insert 138. As such, the side wall 140 of the insert and the cross bar portion 162 converge toward each other on each lateral side, toward the respective throat sections.

Above the throat sections, the diverging sections are created by forming the insert side wall and base edge walls such that these two components diverge from each other. In the embodiment shown, the throat sections are located at the tangent point between the tubular insert side wall and the edge wall. As such, the natural curvature of the insert side wall away from the edge wall will form a divergent section which may be sufficient. However, to induce a greater pressure drop, and provide smoother flow, additional arrangements are preferred.

Specifically, the edge walls 164 may be angled laterally outward above the throat portion, to form angled wall portions 192 which increase the amount of divergence. Additionally, the base is provided with a central flow guide 194. As best seen in FIG. 4, the central flow guide includes two legs 196, each connected at their lower ends to an associated one of the runners, laterally interior of the gas channels 182. While this connection could be by welding or adhesives, it is preferred that the central flow guide be part of the monolithic extrusion of the base, as shown. The flow guide then takes a generally triangular cross-section, tapering in the direction of gas flow such that the legs 196 are joined together at their upper ends. If desired, and as shown, the flow guide legs may include curvatures to provide greater divergence, and smooth gas flow. With this arrangement, the angled leg portions 192 together with the legs 196 of the flow director form the two diverging sections 190.

As in the previous embodiments, the gas flowing through the throat sections, and in the preferred case of supersonic flow, the two diverging sections, will have a reduced pressure. Also as in previous embodiments, the inflator will include a plurality of draw ports 198 communicating with the ambient air. In this embodiment the draw ports extend through each of the edge walls 164. If the flow is sub-sonic, the inner ends of the draw ports would be located at or just downstream of the throat section 188. For the preferred supersonic flow, however, the inner ends of the draw ports are located in the angled portions 192 of the edge walls 164, as shown.

As explained before, the reduced pressure generated by the gas flow through the venturi will cause ambient air to flow through the draw ports to mix with the gas. This cools the gas, supplements the gas, and forms the final inflation gas mixture. This mixture then continues its upward flow to the diffuser 154. The diffuser is essentially a plate extending between the free ends of the edge walls and between the upper ends of the end plates. While the diffuser may take many forms, in the embodiment shown the diffuser is formed as a section of a tube. The diffuser includes a plurality of final exit ports 200, through which the final gas mixture will exit to flow to the cushion.

The diffuser may be secured to the base in a number of ways, such as fasteners, adhesives, or welding. It is preferred, however that the diffuser is secured using a mating protrusion and groove arrangement, similar to the insert 138. As such, lateral edges 202 of the diffuser may form the protrusions, and appropriate longitudinal grooves 204 are formed at the upper ends of the edge walls. By then forming the end plates with a sufficient height to block longitudinal movement of the diffuser, the diffuser will be securely retained.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An inflator for an airbag, comprising:

a housing having a base having U-shape in a cross-sectional plane normal to a longitudinal axis, said base including a cross bar portion and two edge walls, and exit ports located adjacent free ends of said edge walls;

a quantity of gas generating material located in a generant chamber between said edge walls;

a venturi section located between said generant chamber and said exit ports with respect to flow of inflation gas from said gas generating material, and said venturi section being located between said gas generating material and at least one of said edge walls; and at least one draw port extending through said housing and providing communication between said venturi section and atmosphere.

2. An inflator as in claim 1, wherein said venturi section includes a converging section, a throat section, and a diverging section, and said draw port opens onto said diverging section.

3. An inflator as in claim 1, wherein said gas generating material expels gas in a direction towards said cross bar portion, and said venturi section comprises two venturi sections, each located between said gas generating material and an associated one of said edge walls.

4. An inflator as in claim 3, wherein said gas generating material is supported in an insert, said insert being mounted in said base by a pair of runners, each said runner extending between an associated one of said edge walls and said insert, said runners each including a plurality of gas channels extending therethrough.

5. An inflator as in claim 4, wherein said runners form throat sections of said venturi sections.

6. An inflator as in claim 4, wherein said base further includes a central flow guide having two legs, each of said legs having a lower end mounted to an associated one of said runners and upper ends secured together, said central flow guide forming diverging sections of said venturi sections.

7. An inflator as in claim 6, further including a plurality of said draw ports, and wherein said draw ports open onto said diverging section.

8. An inflator as in claim 1, wherein said gas generating material comprises a stored gas.

* * * * *